United States Patent [19]

Ackerman et al.

[11] 4,386,189

[45] May 31, 1983

[54] PROCESS FOR THE POST-CHLORINATION OF VINYL CHLORIDE POLYMERS

[75] Inventors: Alfred J. Ackerman, West Chester, Pa.; David L. Lull, North East, Md.

[73] Assignee: Delaware City Plastics Corporation, Dallas, Tex.

[21] Appl. No.: 260,828

[22] Filed: May 5, 1981

[51] Int. Cl.³ .............................................. C08F 8/22
[52] U.S. Cl. ................................. 525/358; 525/331.6
[58] Field of Search ........................................ 525/358

[56] References Cited

U.S. PATENT DOCUMENTS

| | | | |
|---|---|---|---|
| 2,590,651 | 3/1952 | Rosenberg | 204/163 |
| 2,996,489 | 8/1961 | Dannis et al. | 260/92.8 |
| 3,100,762 | 8/1963 | Shockney | 260/92.8 |
| 3,287,336 | 11/1966 | Taylor | 260/87.1 |
| 3,328,371 | 6/1967 | Beer | 260/92.8 |
| 3,506,637 | 4/1970 | Makino et al. | 260/92.8 |
| 3,598,708 | 8/1971 | Jackson | 525/358 |
| 3,700,632 | 10/1972 | Beale et al. | 260/87.5 C |
| 4,049,517 | 9/1977 | Adachi et al. | 204/159.18 |

FOREIGN PATENT DOCUMENTS

| | | | |
|---|---|---|---|
| 39-25996 | 11/1964 | Japan | 525/358 |
| 609693 | 10/1948 | United Kingdom | 525/358 |
| 976001 | 11/1964 | United Kingdom | 525/358 |
| 1120769 | 7/1968 | United Kingdom | . |
| 1200711 | 7/1970 | United Kingdom | . |
| 1378364 | 12/1974 | United Kingdom | . |

*Primary Examiner*—Paul R. Michl
*Attorney, Agent, or Firm*—Arthur S. Collins; John J. Freer

[57] ABSTRACT

A simple and practical method for making post-chlorinated polymers based upon vinyl chloride is provided based upon conducting the chlorination reaction on a granular polymer suspended in aqueous hydrochloric acid in the presence of a stoichiometric excess of liquid chlorine and in the absence of any significant amount or organic solvent/swelling agent. Use of photo-radiation techniques is also avoided since the reaction is activated by means of a minor fraction of a percent based upon weight of said polymer of an organic peroxy compound which decomposes to form free radicals at the temperatures involved in the reaction.

10 Claims, No Drawings

PROCESS FOR THE POST-CHLORINATION OF VINYL CHLORIDE POLYMERS

This invention relates to an improved process for effecting the post-chlorination of synthetic resins polymerized solely or predominantly from vinyl chloride. The starting materials of interest in the present process may therefore be conveniently referred to as thermoplastic vinyl chloride polymers which explicitly include not only vinyl chloride homopolymers but also copolymers of vinyl chloride with one or more suitable comonomers wherein vinyl chloride units account for at least about 75 percent of the total weight of the copolymer. Especially notable among suitable comonomers are vinylidene chloride and various other well-known classes of mono-olefinic compounds including the aliphatic hydrocarbons like ethylene, the vinyl aromatics like styrene, vinyl esters such as vinyl acetate, acrylic acids and their derivatives (e.g., ethyl acrylate, acrylamide or acrylonitrile) and vinyl heterocyclic like vinyl pyridine. The most preferred starting materials are the essentially homopolymeric resins and copolymeric resins at least about 85 percent by weight of which is derived from vinyl chloride monomer.

BACKGROUND OF THE INVENTION

Historically, photoillumination techniques have been prominently featured in the main stream of evolving process technology for post-chlorinating vinyl chloride polymers. In fact, a primary interest in photochemical chlorination for post-chlorination of polyvinyl chloride resins has persisted over the years in spite of gradually emerging evidence of certain advantages in conducting post-chlorinations on such resins while in a solid granular state rather than in a solution or highly solvent swollen gel form.

The strong emphasis on actinic light or other forms of photochemical activation in the development of this art is readily seen in the following representative set of early patents:

U.S. Pat. No. 2,426,080—PVC resin in solution.
U.S. Pat. No. 2,590,652—Dry powdered resin in rotary reactor.
U.S. Pat. No. 2,996,489—Aqueous suspension of granular resin containing some solvent.

Photochemical activation of post-chlorination processes for vinyl chloride polymers has continued to occupy a prominent role in the technical literature of the intervening period and the present era as well, as witnessed by the following patents:

British Pat. No. 1,120,796—PVC resin dispersed in hydrochloric acid purged to remove oxygen before introduction of chlorine gas.
British Pat. No. 1,200,711—Dry granular resin impregnated with minor proportion of solvent.
U.S. Pat. No. 3,700,632—Fluid bed of dry granular resin.
British Pat. No. 1,378,364—Resin in form of 30 to 300 micron-sized coagula of suspension polymerized PVC powder (either dry or in aqueous suspension).
U.S. Pat. No. 4,049,517—Aqueous suspension of vinyl chloride resin in absence of any solvent.

Some negative, or at least neutral, comments concerning the use of photoactivated post-chlorination of PVC resins are also encountered in the patent literature, as illustrated by the following tabulation of four specific noteworthy examples.

U.S. Pat. No. 3,100,762 (Shockney)—teaches that in the substantial absence of both actinic radiation and oxygen, an aqueous suspension of porous, granular PVC resin can be successfully chlorinated in the presence of a chloromethane swelling again at temperatures of 60° to 100° C. and gauge pressures of from about 20 to about 80 psi.
U.S. Pat. No. 3,287,336 (Taylor)—demonstrates the feasibility of effecting post-chlorination of granular PVC resin dispersed in aqueous media at temperatures of 54° to 85° C. by activation with a small amount of oxygen rather than by means of actinic radiation.
U.S. Pat. No. 3,328,371 (Beer)—recommends use of an acyl persulfonate catalyst in the absence of light to activate the post-chlorination of PVC polymers dispersed either in a chlorinated hydrocarbon or in an aqueous medium in the presence of a chlorinated hydrocarbon.
U.S. Pat. No. 3,506,637 (Makino)—indicates that photoradiation and elevated pressures are undesirable constraints and recommends use of temperatures from 55° to 80° C. and use of chlorine gas containing 0.05 to 0.35 percent oxygen by volume for chlorinating PVC resin agglomerates while dispersed in water or hydrochloric acid free of swelling agents.

The last four patents highlighted above appear to offer promising alternatives to the heavy reliance usually placed upon photochemical activation techniques in achieving satisfactory chlorination of granular PVC resins. However, the processes proposed by Shockney and by Beer both require the presence of substantial proportions of extraneous chlorinated hydrocarbon swelling agents (such as the chloromethanes) which must then be removed from the chlorinated PVC resin product and recovered. The other two of the above four patents (namely Taylor and Makino) both depend upon careful regulation of the proportion of molecular oxygen supplied to their reaction systems while the PVC resin is being chlorinated. In view of the low concentrations of oxygen involved, maintaining complete and accurate control over the quantitative supply of same throughout the chlorination process appears to be just as difficult a regulatory method to rely upon as those involving attempts to apply complicated photoradiation devices uniformly on a large scale.

In view of this state of the art, there continues to be a need for simpler and more straightforward methods of carrying out the chlorination of granular vinyl chloride resins on a commercial scale wherein tight control can easily and reliably be maintained over the course of the chlorination reaction throughout the process, thereby insuring consistent production of chlorinated vinyl chloride resins of high quality. Accordingly, major goals in devising the process of the present invention are the elimination of superfluous components and/or potentially confusing or complicating influences whenever possible, e.g., extraneous swelling agents, molecular oxygen, actinic radiation, etc.

SUMMARY OF THE INVENTION

In accordance with the present invention, an extremely practical, readily controllable and reproducible process for the post-chlorination of granular PVC resins is realized while substantially excluding activation techniques relying upon either photo-radiation or molecular oxygen. Said process comprises reacting a granular microporous polymer at least about 75 percent by weight of which is composed of vinyl chloride with a stoichiometric excess of liquid chlorine in a confined space at a temperature of between about 30° and about 75° C. in the presence of a minor fraction of a percent by weight based upon said polymer of an organic peroxy compound which decomposes at said temperatures to form organic free radicals; and in the absence of a significant amount of organic solvent or swelling agent for said polymer but while the aforesaid components are dispersed in and thoroughly intermixed with dilute aqueous hydrochloric acid in weight proportions not less than about equal to said polymer, the pressure in said confined space being maintained above the vapor pressure of liquid chlorine at least until the chemically combined chlorine content of said polymer has increased significantly, e.g., by at least about 3 percent by weight. In fact, said pressure is preferably maintained above the chlorine liquefaction pressure until substantially all of the chlorination desired has taken place, i.e., usually until an increase of more than about 5 percent by weight has been realized in said combined chlorine content.

In order to assure efficient heat transfer and temperature control, the slurry type reaction mass of our chlorination process should have reasonable fluidity under agitation. Accordingly, the total proportion of liquid components should clearly exceed the solid components, and a minimum volume ratio of liquids to solids of about 2 to 1 is usually prescribed.

DETAILED DESCRIPTION OF THE PREFERRED EMBODIMENT

Rigid vinyl chloride polymers containing at least about 75 percent by weight of vinyl chloride are generally amenable to beneficial post-chlorination treatment, with significant enhancement of physical properties generally being realized by accomplishing an increase of at least about 5 percent by weight in the combined chlorine content of the resin provided that thermal overexposure or other serious degrading influences are avoided.

Such rigid polymers naturally are composed predominantly of large molecules with weight average molecular weights being over 80,000 in most cases. The preferred materials have vinyl chloride contents of at least 85 percent by weight and have weight average molecular weights approximately in the general range of from about 100,000 to about 200,000. An empirical measure of this is a specific viscosity of at least about 1.0 as determined on a 1 percent by weight solution of the polymer in cyclohexanone at 30° C.

Said starting vinyl chloride polymers should be in an easily handled, free flowing solid form containing little or no dusty fines or outsized agglomerates. Medium coarse resins mostly between about 10 and 500 microns in particle size are easily handled, dispersed and treated by the present process. Accordingly, aqueous suspension polymerized grades of vinyl chloride polymers make excellent starting materials because the finished aggregates have good internal microporosity and mostly fall in the size range between about 25 and about 250 microns.

The chlorination of such granular resin is effected in accordance with this invention while said resin is dispersed in liquid media which is largely comprised of aqueous hydrochloric acid and includes liquefied chlorine in substantial excess over that stoichiometrically needed for the level of chlorination to be effected but is substantially free of molecular oxygen and contains no significant amount of organic solvents or swelling agents for said resin. Thus, liquefied chlorine is not only the direct reactant in our process but also acts like a partial solvent or liquid swelling agent to penetrate the granular resin and effect uniform chlorination thereof. Therefore, the initial charge of liquid chlorine should always exceed the stoichiometric proportion required for the chlorination reaction by an incremental amount of at least about 20 percent by weight of said resin so as to insure the continued presence of a definite liquid chlorine phase in the reaction mass until the major portion of the desired resin chlorination has been achieved. Preferably, the excess of liquid chlorine charged over what would suffice for the chlorination reaction per se should be equal to about 25 percent or more by weight of said resin since small amounts of the chlorine will vaporize into the liquid free zone of the confined reaction space and/or be absorbed into the aqueous hydrochloric acid phase. Since about 15 to about 70 percent by weight of chlorine based upon starting resin is theoretically needed for chlorinating same to the preferred levels of approximately a 5 to 12 percent increase in combined chlorine content, the total proportion of liquid chlorine charged in a given run will seldom be less than about 35 percent by weight of the resin.

All things considered, the optimum proportions of liquid chlorine charged will usually lie somewhere in the range from about 40 percent to about 80 percent by weight of the starting resin for practical, trouble-free operation under conditions of greatest commercial interest. Larger proportions are, of course, entirely operable but tend to be less economical due to the resultant reduced capacity of given sized equipment and the costs of handling the increased amounts of chlorine which pass through the process unreacted. The liquid chlorine charge will, therefore, usually not exceed the weight of resin being chlorinated.

As already indicated, aqueous hydrochloric acid is the main component of the liquid medium in the present process and generally substantially exceeds the weight of starting resin. Preferably, the proportion of aqueous hydrochloric acid is not substantially less than double the weight of said resin, and the HCl concentration thereof is approximately in the range of 10 to 30 percent by weight. For most purposes, the optimum concentration of HCl in said acid at the start of a run will be between about 15 and about 25 percent by weight, and the optimum proportions will be between about 200 and about 300 percent by weight of said resin. Obviously, however, the upper proportion of said acid can be as large as 400 percent or more by weight based on said resin, but the economics of the process tend to be adversely effected by handling surplus quantities over the level necessary to provide adequate mixing and heat transfer for control of reaction temperatures and rates (which level seldom substantially exceeds about 300 percent by weight of resin).

In order to safeguard the resin from the dangers of thermal degradation, it is desirable to avoid the use of temperatures substantially over 75° C. in the present process for any significant period of time. Generally, temperatures between about 30° and about 75° C. should be maintained during substantially the entire reaction and, preferably, the bulk of the chlorination reaction is effected within the temperature range of about 35° to about 65° C. In accordance with the present invention, a desirable increase (i.e., about 5 to about 12 percent by weight) in the chemically combined chlorine content of granular vinyl chloride resins can be expeditiously effected within the above-specified temperature ranges by including in the reaction mass a minor fraction of a percent (i.e., less than 0.5 percent by weight based upon said resins) of one or more catalytic organic peroxy compounds which actively decompose into organic free radicals at said temperatures. Those having 10 hour half-life temperatures less than 75° C. are suitable and are generally effective in total proportions of about 0.01 percent to about 0.3 percent by weight based upon the resin to be chlorinated.

Since it is desirable from the standpoint of both product quality and cost to attain the desired level of chlorination within a relatively short time (e.g., a few hours at most) while controlling the reaction temperature safely within the specified levels, those free radical generating organic peroxy compounds having 10 hour half-life temperature of less than about 60° C. are especially preferred, the optimum concentrations of which are between about 0.02 percent and about 0.2 percent by weight of the starting resin in most cases. Said preferred free radical generating compounds are normally selected from the group consisting of peroxy carboxylic acid esters, diorganoperoxycarbonates, diacyl peroxides and mixed anhydrides or organic suloperacids and carboxylic acids. Among the prominent individual compounds of the four types comprising said group are t-butyl peroxypivalate, di(2-ethylhexyl)percarbonate, acetyl-2-chlorooctanoyl peroxide and acetyl-cyclohexylsulfonyl peroxide.

A well-stirred pressure vessel or autoclave, the outer wall of which is closely surrounded by an enclosed jacket or passageway for circulation of heat transfer fluids, is quite suitable for confinement of the reaction mass in which the present process is conducted. The autoclave should be designed for working pressures expected in the main reaction zone, i.e., usually the autogenous pressure generated by the reaction mixture and principally due to the liquefied chlorine, the vapor pressure of which varies from about 125 psia at 30° C. to about 350 psia at 75° C. Also the inner wall of said reaction zone should be designed to resist corrosion by hydrochloric acid, e.g., constructed of glass-lined steel or suitably inert or passivated metal or metal alloy. The heat transfer jackets of passageways surrounding the reaction zone enable the reaction mass to be heated to initiate or accelerate the reaction and are especially important in removal of enough of the heat produced by the chlorination reaction to keep reaction temperatures under control and regulate the overall course of the reaction. In fact, for a well-controlled reaction, the extent of chlorination can be estimated closely by continuously monitoring the exothermic heat released.

The present process is most amenable to batch style operation in which the resin and hydrochloric acid are charged first at about ambient temperatures to form a slurry which is then sparged with nitrogen while venting the entire reactor system in order to eliminate most of the molecular oxygen and air therefrom. After a subsequent short purge with chlorine gas to remove most of the nitrogen, the desired charge of liquefied chlorine is introduced at about room temperature or below. Finally, with the stirrer operating to maintain a well-mixed reaction mass, the catalytic organic peroxy compound is added thereto followed by gradual warming of the reaction mixture to initiate the chlorination reaction smoothly.

As an aid in handling and incorporating the catalytic organic peroxy compounds, extended or diluted forms of same such as dispersions or solutions thereof in a suitable carrier or solvent are often used, for example, containing concentrations of about 25 to 75 percent by weight of the active ingredient. Among the solvents or diluents commonly used are mineral oil, mineral spirits and the like, which would not be desirable in significant proportions in the reaction mass of the present process but are not particularly harmful at the low levels of catalyst usually involved here (i.e., not more than about 0.3 percent by weight of the resin at most). However, if for some reason the total amount of diluent desired or needed would amount to as much as 1 percent by weight of resin, it is recommended that water or aqueous liquid be used at least in part so that the amount of organic solvent present in the reaction mass is kept at an insignificant level.

Once the chlorination reaction has been actively initiated, the temperature of the reaction mass will start to rise noticeably. Thereafter, control of the reaction will effectively depend upon control of reaction temperatures, accomplished primarily by adjustments in rates of heat transfer from the reaction mass. In addition, close control of the chlorination reaction can sometimes be assisted by the use of modified methods of introducing the catalytic peroxy compounds. For example, instead of adding the entire amount of said peroxy compound before bringing the reaction mass to activate chlorination temperatures, the gradual, delayed or incremental addition of at least a portion of same may help to even-out reaction conditions and assure more uniform results. In addition, the combined use of a plurality of catalytic peroxy compounds having considerably different 10 hour half-life temperatures can be an effective measure for achieving a uniform chlorination reaction and maintaining smooth control in a run wherein the reaction temperature is allowed to increase gradually, e.g., rising slowly from a starting level of around 35° C. to a final value of around 65° C.

Using the above-described process conditions (including reaction temperatures, etc.) together with the indicated control techniques (such as effective cooling and the use of only minor fractions of a percent of appropriate organic peroxy promoters), the desired chlorinations of the vinyl chloride resins of interest can be successfully completed within reaction times of less than about five hours. In fact, run times as low as about 1 to about 3 hours are sufficient to accomplish chlorinations of greatest practical interest under generally optimized conditions which include controlling reaction temperatures so that substantially the entire chlorination reaction takes place within the preferred temperature range from about 35° to about 65° C.

Following accomplishment of the desired chlorination reaction, the pressure in the confined reaction space is gradually relieved back to substantially atmospheric by carefully venting and collecting chlorine gas through a suitable valved opening in the head space thereof. Nitrogen gas is then sparged through the hot product slurry from the bottom to purge same of most of the residual chlorine. The chlorinated polymer product is then recovered by the conventional aqueous slurry processing techniques involving such steps as centrifuging and/or filtering, washing of wet solids to remove hydrochloric acid and drying (preferably under conditions which avoid heating the resin substantially above about 75° for more than a few minutes). Generally, purification of the product of the present process can be accomplished with unexpected ease compared to the experience encountered with slurry type chlorinations in which significant amounts of chloroform or other organics are used as liquid swelling agents or solvents for the resin.

The chlorinated resins produced by the present process have many advantages over the starting resinous raw materials, especially in high temperature strength and integrity. For example, the Vicat softening points and heat distortion temperatures under load are both substantially increased compared to the original resin treated, as well as tensile and flexural strengths. Furthermore, other properties such as flame resistance and thermal and chemical stability can be inherently upgraded by such post-chlorination treatments which raise the chlorine content of the resin by about 5 to 12 percent by weight.

A more complete understanding of the detailed practice of the present invention and the advantages thereof can be obtained from a study of the following illustrative examples in which the amounts of various components are generally given in parts by weight unless otherwise indicated.

EXAMPLE 1

The reaction vessel used in conducting the chlorination process was a 100-gallon glass-lined autoclave equipped with integral cooling/heating jacket, an externally driven, top-entering three-bladed (glassed) retreat agitator and a large drain valve located in the central, lowest portion of the dished bottom thereof with a smaller valved entry port adjacent thereto.

About 500 pounds of medium strength hydrochloric acid (ca 24 percent HCl by weight) and 150 pounds of a suspension polymerized grade of PVC homopolymer having a weight-average molecular weight somewhat above 100,000 (i.e., a specific viscosity of about 1.3 as determined in solution in cyclohexanone) were initially charged to the reactor with agitation to form a uniform slurry. Then, to remove most of the molecular oxygen and air, nitrogen gas was sparged into said slurry through said bottom entry port for about 30 minutes while drawing off gas through an exhaust vent at the top of the vessel. This was followed promptly by a short purge with chlorine gas to displace most of the nitrogen atmosphere remaining.

Next, the exhaust vent was tightly closed and 120 pounds of liquid chlorine were slowly admitted into the vessel through said bottom entry port with the agitator running. Agitation was continued for about 10 minutes after all the chlorine had been charged in order to attain a uniform mixture and assure thorough contact between PVC resin and liquid chlorine. The temperature of the resultant mixture is generally between about 10° and 25° C. Said temperature could be readily adjusted, of course, since the cooling/heating jacket was connected to a water supply, the temperature of which was closely controllable over a range from about 5° to about 95° C.

Finally, to said uniform and cool aqueous mixture with the agitation continuing, a combination of two different organic peroxy compounds was injected as follows:

(1) about 20 grams (0.044 lbs.) of acetyl-cyclohexylsulfonyl peroxide dissolved in 175 grams of carbon tetrachlorides, and (2) about 9 grams (0.02 lbs.) of t-butyl perpivalate diluted with about 3 grams of benzene.

Medium hot water (ca 50° C.) was then passed through the jacket surrounding said vessel until the temperature of the agitated aqueous slurry therein reached about 35° C. at which point it began to rise more rapidly indicating that the chlorination reaction had started. The rate of rise in temperature of the reaction mass was then restrained by lowering the temperature of the jacket water below the reaction mass temperature (i.e., to about 30°C. initially and gradually over the next half hour down to about 10° C.). The temperature of the reactants continued to rise fairly steadily until it briefly exceeded the intended maximum of 75° C. at about the end of one hour of total reaction time. However, at this level, the heat extracted by the jacket water began to exceed the exothermic heat of the chlorination reaction, reducing the temperature to about 75° C. within about 15 minutes. The jacket water temperature was then adjusted to about 25° C. and over the next two hours was gradually increased further so as to strike an approximate balance between the rate of heat extraction thereby and the heat released by the now subsiding chlorination reaction. This resulted in the reaction temperatures being stably controlled within a range of about 70° to 55° C. during said two-hour period.

The pressure in the reaction vessel was relieved by opening the exhaust vent at the top allowing any remaining liquid chlorine to vaporize and flow into the exhaust system. These chlorine vapors were found to be highly concentrated and relatively free of HCl or other impurities indicating that most of the by-product HCl from the chlorination reaction had been dissolved by the hydrochloric acid medium.

After the bulk of the unreacted chlorine had been freely released in relatively pure form as described, the product slurry was treated to remove small amounts of residual, dissolved or trapped chlorine by sparging nitrogen gas therethrough from the bottom while still passing 55° C. water through the vessel jacket to keep said slurry hot. The product slurry was then discharged from the vessel, filtered and the wet solids further purified by washing with water and/or dilute aqueous solutions of alkali or other acid neutralizing agents.

After drying at maximum temperatures of about 75° C., the chlorinated PVC product had excellent color and a specific gravity of 1.575 indicating a combined chlorine content of about 67 percent by weight compared to about 57 percent for the starting PVC homopolymer. Furthermore, when compounded into a simple formulation containing (in addition to a conventional combination of minor lubricants and stabilizers), only about 7 parts of chlorinated polyethylene and 5 parts of acrylic processing aid (Acryloid K-120N) per 100 parts by weight of resin, outstanding physical properties were exhibited as indicated by the following table of averaged measurements:

| Test | ASTM No. | Typical Values |
|---|---|---|
| Izod Impact Strength @ 73° F. | D-256 | 5.2 ft-lbs/in |
| Heat Deflection Temperature @ 264 psi | D-648 | 106° C. |
| Tensile Strength @ 73° F. | D-638 | 8100 psi |
| Flexural Strength @ 73° F. | D-790 | 13,700 psi |

EXAMPLE 2

The run described in Example 1 was repeated in substantially the same manner except that the amount of acetylcyclohexylsulfonyl peroxide used was reduced slightly to about 19 grams with the amount of carbon tetrachloride solvent associated therewith likewise being slightly less (ca 170 grams). The reaction temperature was somewhat more fully controlled this time so that the maximum temperature reached was only 61° C. As a result, the reaction time was extended by 30 minutes to a total of 3.5 hours, but the chlorinated PVC product obtained was substantially the same in all important respects.

EXAMPLE 3

Another run was made substantially as in Example 1 using the same proportions of all components charged. In this case, the heat transfer rates were controlled more precisely with the result that the maximum temperatures attained in the reaction mass was about 57° C. The reaction time was, therefore, increased somewhat to a total of about 4 hours, leading to the production of a chlorinated PVC product of very similar chlorine content, substantially the same overall quality and very similar physical properties.

EXAMPLE 4

The ingredients for this example were the same as in Example 1 except that the amount of t-butyl perpivalate used was increased to about 11.3 grams (0.025 lbs) with the amount of benzene associated therewith also being increased to 3.8 grams. Except for the first 15 minutes when the reactant temperatures were kept between about 35° and about 45° C., the chlorination reaction was conducted mostly between 60° and 75° C. The total reaction time was only about 75 minutes with the maximum temperature reaching about 80° C. for a few minutes in the middle of the run.

The resulting chlorinated polymer had a combined chlorine content of about 65 percent by weight and was of good color and adequate stability. Although definitely superior in high temperature strength to the starting PVC homopolymer, the product of the present example was not as strikingly superior in this regard as those from Examples 1-3. Thus, when formulated similarly into a finished compound, the present chlorinated product exhibited an Izod impact strength of about 1.7 ft.lbs/in. and a heat distortion temperature of about 96° C.

Good results are also obtained when substitutions in reactants and modifications in conditions are made in the specific embodiments described above in accordance with the general principles of our invention as taught herein. Accordingly, the scope of this invention and the protection thereon are to be measured by the claims appended hereto.

What is claimed is:

1. A process for the post-chlorination of a granular, microporous solid polymer of which about 75 to about 100 percent by weight is derived from vinyl chloride so as to increase the chlorine content thereof by at least about 5 percent by weight, said process comprising (a) establishing a reaction mass having a stoichiometric excess of liquified chlorine, providing a distinct liquid chlorine phase, (b) permitting reaction of granular polymer contained in said reaction mass at a temperature of between about 30° and about 75° C. and in the presence of a minor fraction of a percent by weight based on said polymer of organic peroxy catalyst which generates organic free radicals at said temperature, and (c) maintaining said liquid chlorine phase of the reaction mass through the major portion of chlorination while also maintaining reactants as a thorough intermixture in a pool of aqueous hydrochloric acid which is at least equal to the weight of said polymer and in the presence of less than 1 percent by weight, based on said polymer, of organic solvents or swelling agents.

2. A process as in claim 1 which is conducted in the substantial absence of actinic radiation or molecular oxygen.

3. A process as in claim 1 wherein said granular polymer is largely between about 10 and about 500 microns in particle size.

4. A process as in claim 1 wherein said aqueous hydrochloric acid is at least about twice the weight of said polymer and contains from about 10 to about 30 percent HCl by weight.

5. A process as in any of the previous claims wherein the amount of liquefied chlorine introduced is at least about 35 percent by weight of said granular polymer, and the amount of said organic peroxy catalyst is between about 0.01 percent and about 0.3 percent thereof by weight.

6. A process as in claim 1 or 2 wherein the weight average molecular weight of the starting granular polymer is not substantially less than about 100,000; the vinyl chloride content of the same is at least about 85 percent by weight; said organic peroxy catalyst is chosen from peroxy carboxylic acid esters, diorganoperoxycarbonates, diacyl peroxides, mixed anhydrides of organic sulfoperacids with carboxylic acids and mixtures thereof; and the total concentration of said catalyst is between about 0.02 percent and about 0.2 percent by weight of said starting polymer.

7. A process as in claim 6 wherein the pressure is maintained above the vapor pressure of liquid chlorine until at least the major part of the ultimate chlorination has been accomplished.

8. A process as in claim 6 wherein the chlorination is accomplished within a period of about 1 to about 5 hours, and the pressure is above the vapor pressure of liquid chlorine throughout substantially the entire chlorination.

9. A process as in claim 6 wherein a major portion of the total catalyst is added at the beginning but at least one addition of same is made after a major part of the ultimate chlorination has occurred.

10. A process as in claim 1 wherein the amount of liquefied chlorine charged does not substantially exceed the amount by weight of said granular polymer.

* * * * *